United States Patent [19]

Yeh

[11] 4,380,322
[45] Apr. 19, 1983

[54] TAPE REWINDING APPARATUS FOR VIDEO CASSETTE

[76] Inventor: Chun T. Yeh, No. 6, Lane 308, Bao San Rd., Hsin Chu, Taiwan

[21] Appl. No.: 208,190

[22] Filed: Nov. 19, 1980

[51] Int. Cl.³ .......................... G03B 1/04; G11B 15/32
[52] U.S. Cl. .................................................... 242/198
[58] Field of Search ..................... 242/197, 198, 188; 360/96.1, 96.5, 132

[56] References Cited

U.S. PATENT DOCUMENTS 3,863,267  1/1975  Fujinaka ................................ 360/93
3,902,681  9/1975  Boehme ................................ 242/198
3,988,779  10/1976  Leis et al. ............................. 360/96
4,259,701  3/1981  Pera ..................................... 360/96.5

Primary Examiner—Leonard D. Christian
Attorney, Agent, or Firm—Lackenbach, Siegel, Marzullo, Presta & Aronson

[57] ABSTRACT

A tape rewinding apparatus for the video cassette comprising a built-in tape end detecting member which will detect the tape end and generate an electric signal; an ejecting solenoid actuated by said electric signal to start the cassette eject operation; and an electronic control circuit for automatically cutting the power supply.

2 Claims, 8 Drawing Figures

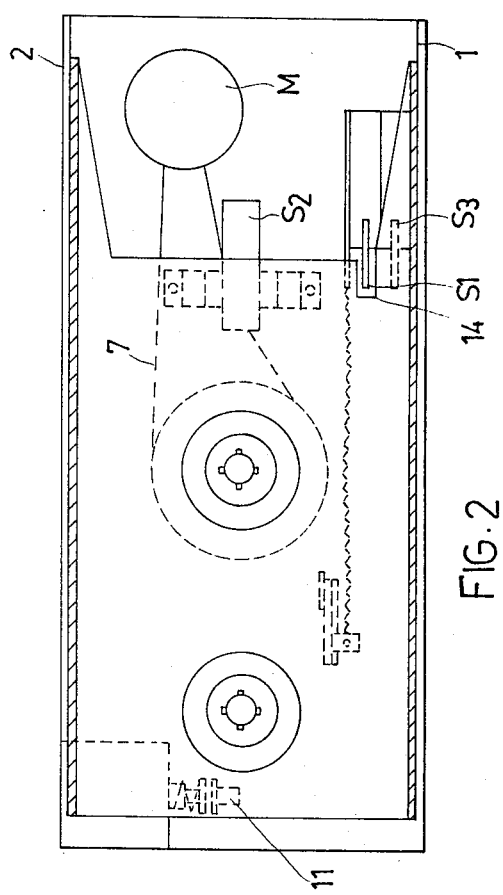
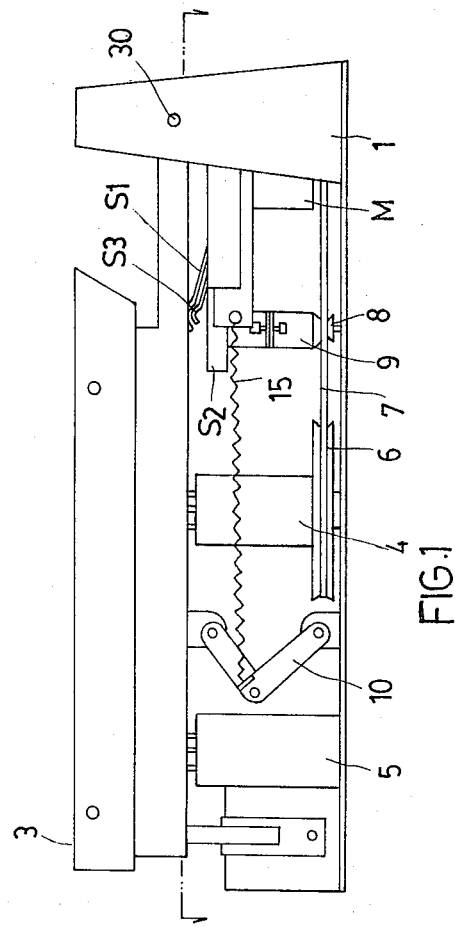
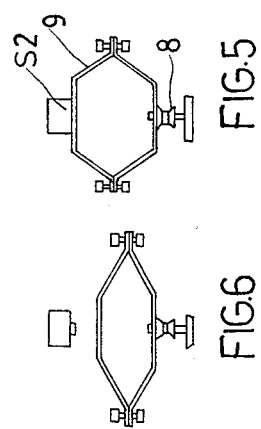
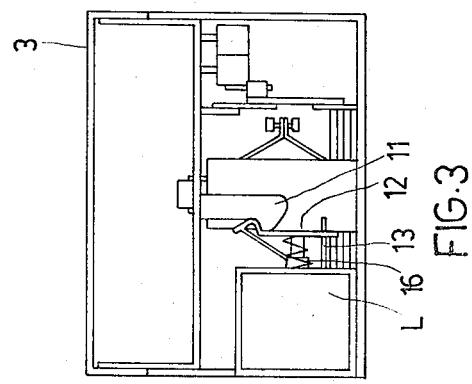

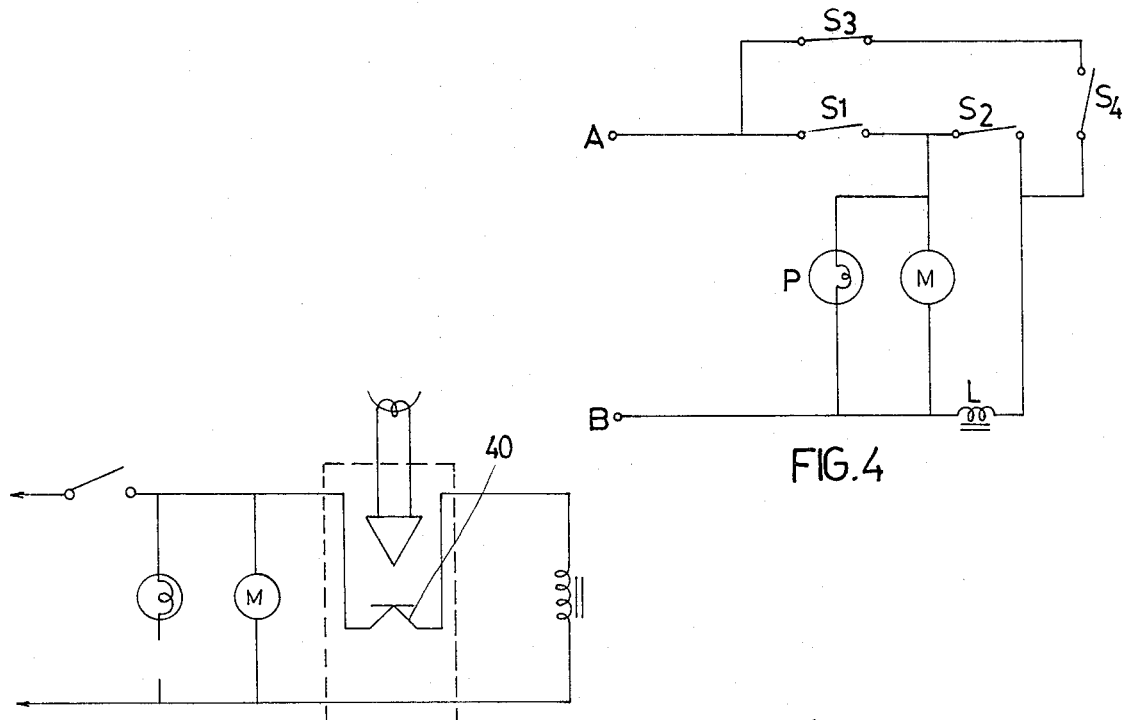
FIG.4
FIG.8
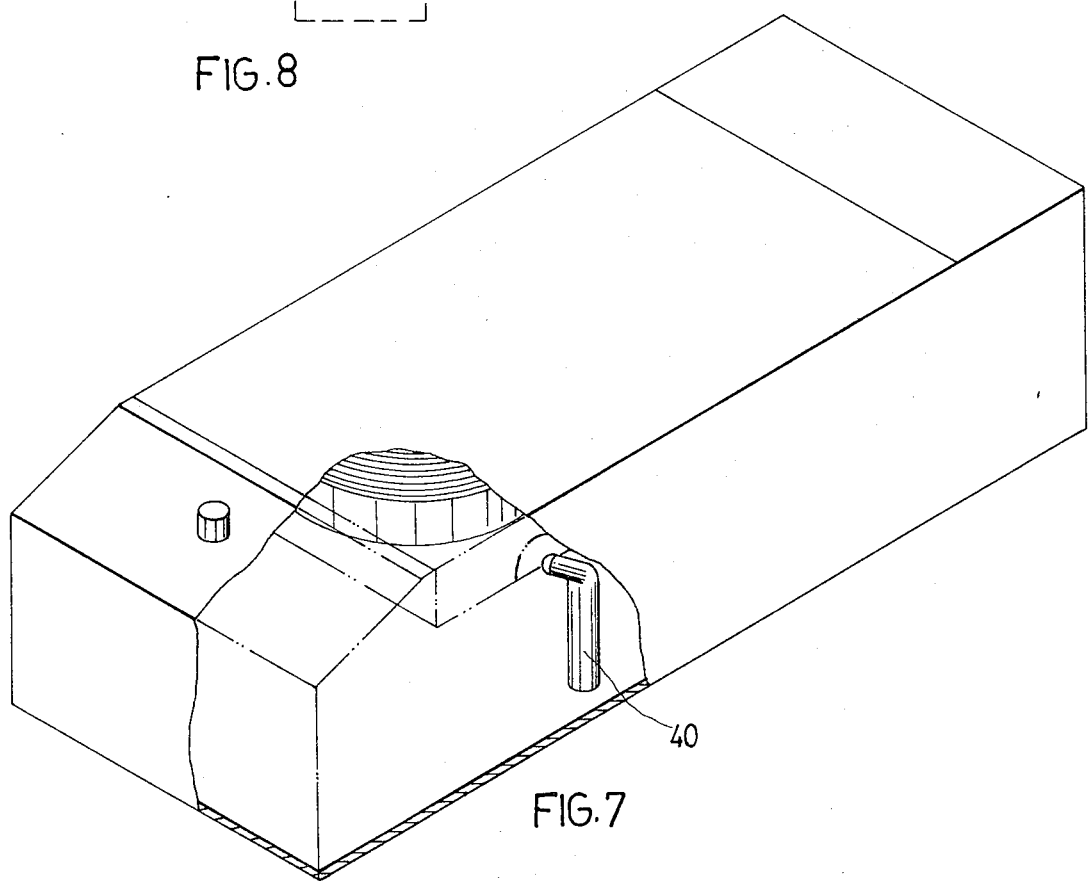
FIG.7

TAPE REWINDING APPARATUS FOR VIDEO CASSETTE

BACKGROUND OF THE INVENTION

The present invention relates to an improved rewinding apparatus of video cassette, particularly, to the one which can automatically eject the cassette and cut the power supply.

In order to make the magnetic head durable, a conventional video cassette recorder does not employ the built-in rewinding apparatus to rewind the tape. Instead, an independent rewinding apparatus is usually used to perform the function. When the independent rewinding apparatus is at work, the user is tied by watching. To eject the cassette manually, he has to wait till the completion of the rewinding.

SUMMARY OF THE INVENTION

In accordance with the present invention, a tape rewinding apparatus for the video cassette comprises: a tape end detecting member which sends an electric signal as the end of the tape reaches; and means for ejecting the cassette upon receipt of the electric signal, characterized in that the means for ejecting the cassette upon receipt of the electric signal comprises a catch which locks a cassette compartment lid at its close position, and a solenoid which can release the catch to open the lid upon receipt of the electric signal.

The mentioned tape end detecting member can either be a centrifugal switch or a photo-electric sensor. The centrifugal switch is driven by the same transmission belt as that drives a winding spindle of the rewinding apparatus. When the tape can not be further rewound, the winding hub hinders the winding spindle from rotating so that the transmission belt stands still. Therefore, the revolution speed of the centrifugal switch will slow down to actuate a contact to excite the solenoid.

The photo-electric sensor, which is provided near the take up reel, can excite the solenoid as the plastic tape end of the reel, which is brighter than the magnetic material coated tape portion appears.

It is an object of the present invention to provide a video cassette rewinding apparatus which can automatically eject the cassette till the completion of the rewinding.

This and other objects can be more apparent by describing a preferred embodiment with reference to the following drawings, in which:

BRIEF DESCRIPTION OF THE FOLLOWING DRAWINGS

FIG. 1 is a front view of a video cassette rewinding apparatus according to the present invention;

FIG. 2 is a top view of a video cassette rewinding apparatus according to the present invention;

FIG. 3 is a side view of a video cassette rewinding apparatus according to the present invention;

FIG. 4 is a controlling circuit of a video cassette rewinding apparatus according to the present invention;

FIG. 5 is a side view of a centrifugal switch which may be employed in the apparatus of FIG. 1 illustrating it in a state without centrifugal force;

FIG. 6 is a view of a centrifugal switch as in FIG. 5 except that it is in a state with centrifugal force;

FIG. 7 is a perspective view of an embodiment according to the present invention, in which a photosensor is provided; and FIG. 8 is a schematic view of a controlling circuit which is employed in the apparatus of FIG. 7.

DETAILED DESCRIPTIONS OF THE PREFERRED EMBODIMENTS

As shown in FIGS. 1-3, a pair of brackets 1 and 2 are parallel spaced to each other. A cassette compartment lid 3 which has a groove (not shown in the drawings) thereof for holding the cassette, is pivoted at the brackets 1 and 2 by a pin 30. At the underside of the lid 3 provided with a catch 11 which is hooked by a controlling member 12. The lid 3 is pulled to open by a spring 15 through a crank arm 10. As the lid 3 is closed, the catch 11 is hooked by a controlling member 12 and the spring 15 is in tense state. When the controlling member 12 is driven by the solenoid L to release the catch 11, the spring 15 will rebound and pull the crank arm 10 to open the lid 3. A winding spindle 4 is driven by transmission belt 7 through a pulley 6 which is provided at the bottom of the winding spindle 4. At the path of the transmission belt 7 is provided with a small pulley 8 which is also driven to revolve by the transmission belt 7. On the top of the small pulley 8 is mounted with a centrifuge-type actuator 9. When the video cassette is placed in the cassette compartment (not shown in the drawings), the winding spindle 4 cooperating with the other winding spindle 5, rewinds the tape reel.

A controlling circuit which is built in a rewinding apparatus according to the present invention is shown in FIG. 4. As shown, P denotes a pilot lamp; M, a motor; L, a solenoid; S1, a tape detecting switch; S2, a tape rewinding switch; S3, a switch controlled by the lid; and S4, a lid opening switch S4 respectively.

The centrifuge-type actuator 9, which actuates the switch S2 on-off, is shown more clearly in FIG. 5 and FIG. 6. The centrifuge-type actuator 9 will resolve as the small pulley 8 is driven to rotate by the transmission belt 7. While the centrifuge-type actuator 9 revolves, it sustains detaching from the switch S2 as shown in FIG. 5. After the completion of the rewinding, the winding hub (not shown in the drawings) hinders the winding spindle 4 from revolving and the transmission belt 7 stops driving the centrifuge-type actuator 9. At this moment, the centrifuge-type actuator 9 will elongate to press the switch S2 on, as shown in FIG. 6.

In the operation of the rewinding apparatus, while the lid 3 is closed and the cassette compartment is empty, the tape detecting switch S1 and lid opening switch S4 are off, tape rewinding switch S2 and switch S3 are on.

As the terminals A, B, connect to the power source and the lid opening switch S4 is pressed, the solenoid will be excited to pull the controlling member 12 so as to release the catch 11. The lid 3 will be lifted to open by the crank arm 10 through the rebounding of the spring 15 and the switch S3 will be depressed to be on by the lid 3. Thereafter, the video tape cassette is inserted in the groove of the lid 3, then press and close the lid 3 and the catch 11 is again hooked by the controlling member 12. Switch S1 will be depressed to be on by the cassette, while the switch S3 is again off. The motor M begins to drive the winding spindle 4 as well as the small pulley 8. Through the centrifugal force, the centrifuge-type actuator 9 will detach from the switch 2. After the rewinding is completed, the winding hub hinders the winding spindle 4 from revolving and the transmission belt 7 stops driving the centrifuge-type actuator. At this moment, the centrifuge-type actuator 9 will elongate to press the switch S2 on so as to excite the solenoid L. Consequently, the catch 11 will be released from the controlling member 12 and the lid is open open. The switch S1 is then no longer pressed by the lid 3 and the power to the motor M is off.

In another embodiment according to the present invention, a photo-electric sensor 40 is mounted near the take up reel as shown in FIG. 7. The controlling circuit using this kind of tape end detecting member is shown in FIG. 8. The operation and principle thereof is virtually the same as that utilizing the centrifuge-type actuator. As the brighter end of the tape appears to the zone detected by the photo-electric sensor 40, the photo-electric sensor 40 excites to conduct a transistor. At this moment, the solenoid L is excited and the lid is likewise open.

With the invention thus explained, it is obvious that various modification can be made without departing from the scope spirit of this invention. It is thus intended that the invention be defined by the appended claims.

What I claim is:

1. An electrically operated tape rewinding apparatus for a video cassette including a cassette compartment lid member, the apparatus comprising a tape end detecting member adapted to send an electric signal as the end of a tape appears, and means for ejecting the cassette upon receipt of the electric signal; characterized in that
   said ejecting means comprises a catch which locks the cassette compartment lid at closed position, and a solenoid for releasing the catch to open the lid upon receipt of the electrical signal; and wherein
   said ejecting means further comprises a controlling member driven by said solenoid, and a crank arm urging said lid to an open position.

2. A tape rewinding apparatus for a video cassette having a cassette compartment lid, the apparatus comprising a tape-end detecting member which sends an electric signal as the end of a tape appears, and means for ejecting the cassette on receipt of the electric signal; characterized in that
   said ejecting means comprises a catch for locking the cassette compartment lid at closed position, and a solenoid for releasing said catch to open the lid upon receipt of said electric signal; and wherein
   said tape end detecting member is a centrifuge-type actuator, said apparatus further comprising a motor driving a winding spindle by means of a transmission belt, said actuator being rotatably driven, and, said apparatus further comprising a switch in circuit with said solenoid; and said centrifuge-type actuator is driven to rotate by the transmission belt, whereby the centrifuge-type actuator can activate or inactivate said switch through the the centrifugal force acting on said actuator.

* * * * *